Figure 4:
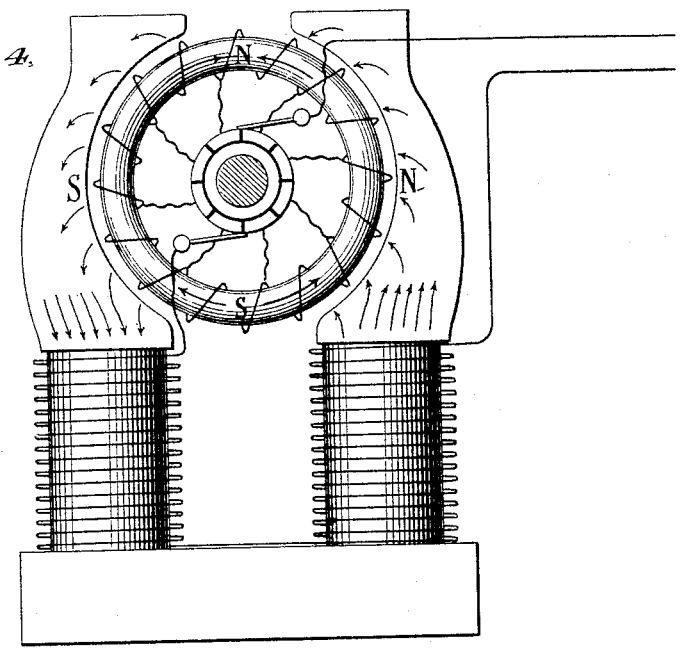

(No Model.) 3 Sheets—Sheet 1.
S. S. WHEELER.
AUTOMATIC REGULATOR FOR ELECTRIC MOTORS OR DYNAMO ELECTRIC MACHINES.
No. 455,267. Patented June 30, 1891.
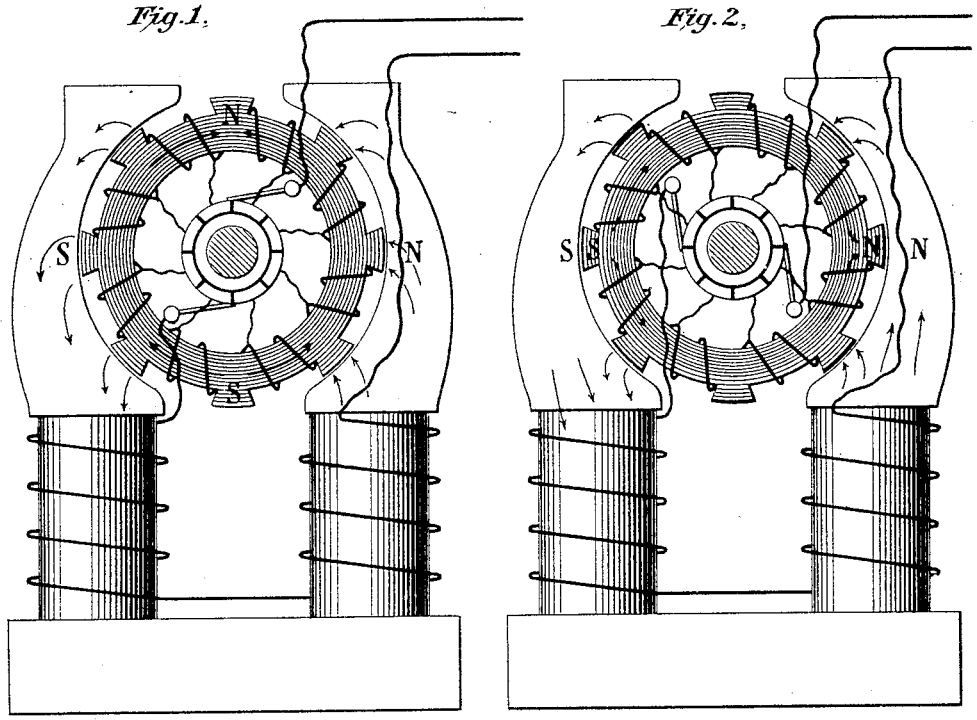
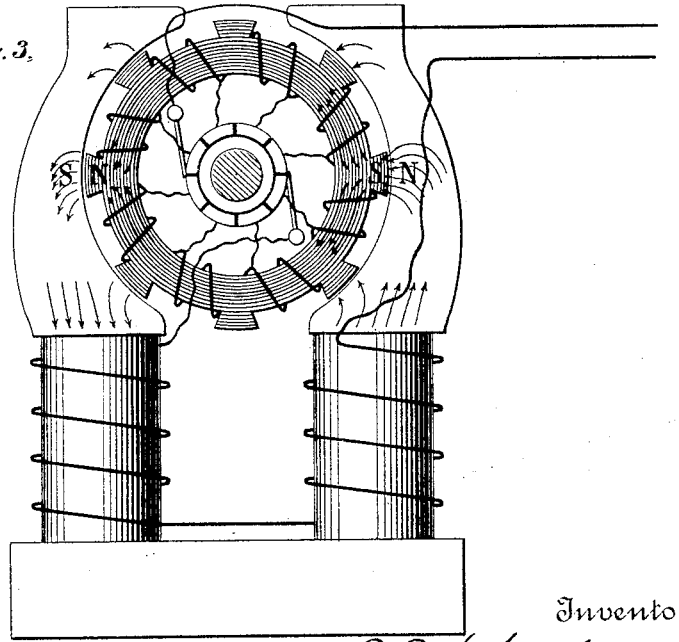
Witnesses
Geo. W. Breck
Edward Thorpe
Inventor
S. S. Wheeler
By his Attorney
Chas. G. Curtis
THE NORRIS PETERS CO., PHOTO-LITHO., WASHINGTON, D. C.

(No Model.) 3 Sheets—Sheet 2.

S. S. WHEELER.
AUTOMATIC REGULATOR FOR ELECTRIC MOTORS OR DYNAMO ELECTRIC MACHINES.

No. 455,267. Patented June 30, 1891.

Witnesses
Geo. W. Breck.
Edward Thorpe.

Inventor
S. S. Wheeler
By his Attorney
Chas. G. Curtis (No Model.) 3 Sheets—Sheet 3.
S. S. WHEELER.
AUTOMATIC REGULATOR FOR ELECTRIC MOTORS OR DYNAMO ELECTRIC MACHINES.
No. 455,267. Patented June 30, 1891.
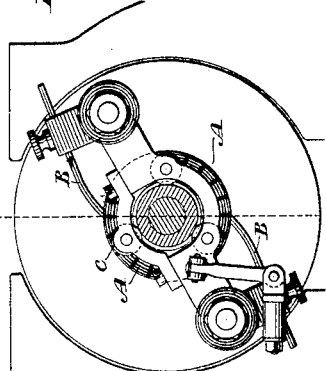
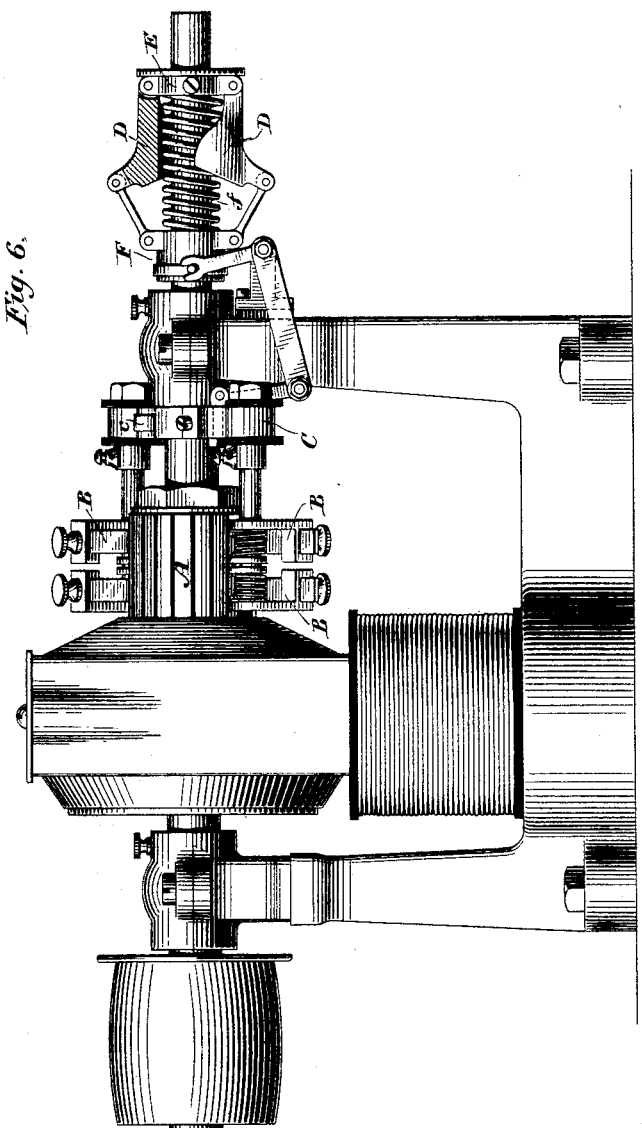
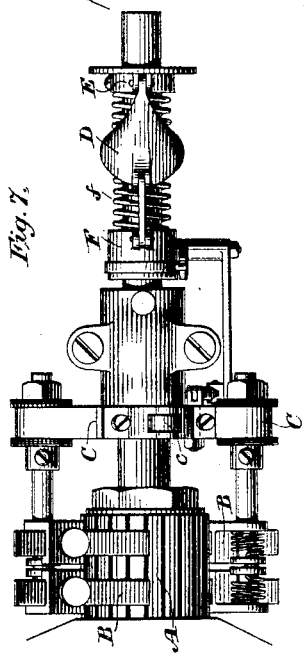
Witnesses
Geo. W. Breck.
Edward Thorpe.
Inventor
S. S. Wheeler
By his Attorney
Chas. G. Curtis

UNITED STATES PATENT OFFICE.

SCHUYLER S. WHEELER, OF NEW YORK, N. Y., ASSIGNOR TO THE CROCKER-WHEELER ELECTRIC MOTOR COMPANY, OF SAME PLACE.

AUTOMATIC REGULATOR FOR ELECTRIC MOTORS OR DYNAMO-ELECTRIC MACHINES.

SPECIFICATION forming part of Letters Patent No. 455,267, dated June 30, 1891.

Application filed November 8, 1890. Serial No. 370,772. (No model.)

*To all whom it may concern:*

Be it known that I, SCHUYLER S. WHEELER, of the city, county, and State of New York, have invented a new and useful Improvement in Automatic Regulators for Electric Motors or Dynamo-Electric Machines, of which the following is a specification.

Many attempts have been made heretofore to devise an automatic speed-governing device or means for automatically maintaining a constant speed under varying loads in an electric motor operated on a "constant-current" circuit, and to accomplish this without the use of cumbersome mechanism and without the loss of electrical energy. In all the attempts heretofore made the difficulty has been that the governing mechanism either responded too tardily to the changes of load, required cumbersome apparatus, and wasted a great deal of electrical energy, or has involved a great deal of sparking at the commutators, which has been so serious as to render the method entirely impracticable. Attempts have been made to effect the regulation of the power of the motor, so as to maintain a constant speed, by mechanism which operated automatically to shift or rotate the commutator-brushes of the machine through a greater or less angle, and thereby vary the torque or electro-dynamic moment of the armature in accordance with the demands of the load upon it; but in cases where this has been tried the sparking produced at the commutator by shifting the brushes out of the neutral space or region which they normally occupy to a point within and more or less near the center of the magnetic field, as is necessary to secure the desired effect, has been so serious that the attempts have been abandoned as complete failures.

I have discovered that by revolving the brushes in the proper direction away from the neutral position, so as to cause the magnetism developed in the armature by the armature-coils to oppose or annul that developed in the pole-pieces of the field, and by constructing the machine on an entirely different principle from that heretofore employed, so that the magnetism in the armature or the magnetizing effect of the armature-coils is very intense and that of the field comparatively weak, (instead of having the magnetism of the field completely overpower that of the armature, as heretofore,) I am enabled to cause the armature to produce such a peculiar effect upon the distribution of magnetism in the field that practically all sparking is suppressed, and I am enabled to move the brushes to any position necessary to secure the desired torque or to produce the necessary variation in the counter electro-motive force developed by the machine.

I will describe my invention by reference to the accompanying drawings, in which—

Figure 5:
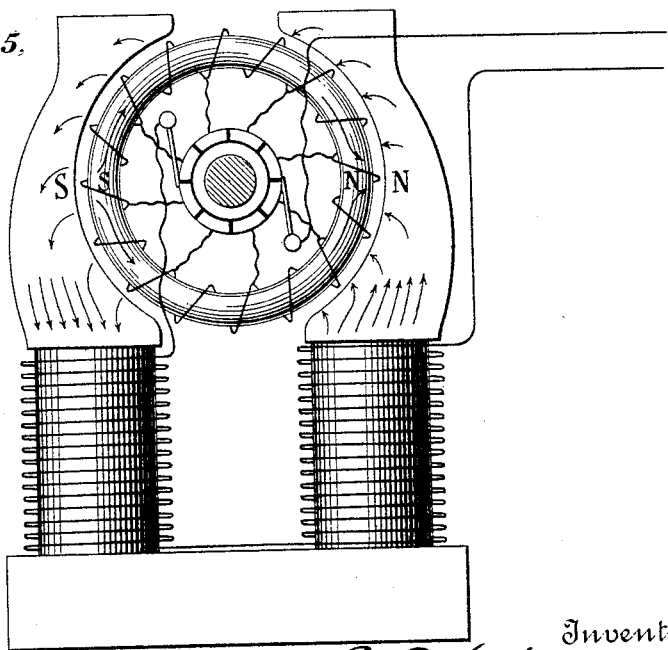

Figures 1, 2, and 3 show the armature and field-magnet of an electric motor constructed according to my invention and representing, respectively, the magnetic effects which are produced by moving the brushes to different positions. Figs. 4 and 5 represent an electric motor constructed on the ordinary principles and show what are the magnetic effects of similarly moving the brushes out of the neutral position in such a machine. Fig. 6 represents a side view of an electric motor provided with an automatic speed-governing apparatus constructed and operating according to my invention, and Figs. 7 and 8 are respectively detailed top and end views of my brush-rotating mechanism.

In Figs. 1, 2, and 3 I have shown a motor so designed and proportioned that the magnetizing effect of the armature-coils is very strong and the magnetizing effect of the field-coils is comparatively weak, or of very much less strength relatively than is usually the case in the ordinary machine. This I accomplish in two ways, first, by putting upon the armature-core a large amount of conductor or winding, considerably greater than is employed in the ordinary machine, and, second, by constructing the armature on the principle of sinking the conductors or windings in spaces or slots in the periphery of the core, one effect of which is to very largely reduce the amount of magnetizing current or effect upon the field necessary to bring it up to the required degree of strength. The consequence is that while I increase the magnetizing effect or magnetic moment of the armature by these means, I at the same time diminish the magnetizing strength of the field-coils or the stability of the field without materially reducing the strength of the magnetism in the field, or, in other words, without materially reducing the magnetic moment or torque exerted between the armature and the field. In the normal position of the brushes, as shown in Fig. 1, the current traversing the armature, as is well known, produces magnetic poles in the armature-core at the points N and S within the neutral region. The coil included between two adjacent commutator-sections, therefore, while passing through this position and under the brushes has no electro-motive force generated in it, because while it is in the neutral region there is no variation of the amount of magnetism or lines of force passing through it, and consequently no sparking takes place. When, however, a coil is passing through any other portion of the field, it is subjected to a varying amount of magnetism, which gives rise to an electro-motive force, and consequently if the brushes be placed in any other position than one within the neutral region in the ordinary machine sparking is produced as the junction between the corresponding commutator-section passes under and leaves the brushes. This, however, is not the case in a machine constructed according to my invention, for reasons which I will now explain.

In Fig. 2 the commutator-brushes are shown as shifted to a position which brings the magnetism developed in the armature by the armature-current in direct opposition to that of the field. By proportioning the comparative strength of the armature and field windings, as I have explained, the effect of this is that the poles of the armature or points opposite the brushes throw out magnetism or lines of force sufficient to practically or largely annul or neutralize the magnetism or lines of force thrown into the armature by the field at these points, and the consequence is that no magnetism from the field enters the armature-core at these points, and the coils which are under the commutator-brushes at these points are not subjected to any change of magnetism, and consequently no sparking is produced as the coil passes under the commutator-brush.

In the drawing, the two arrows represent in a general way the magnetic effect or lines of force thrown out by the armature, which are sufficient to neutralize the lines of force which the field tends to throw into the armature at these points, so that practically no magnetism passes into the armature at the points N and S, and there will be no sparking at the brushes with the brushes in this position. This is also true when the brushes are set in any position intermediate between that shown in Fig. 2 and that shown in Fig. 1, the magnetism in the armature thrown out at the points N and S being sufficient to practically annul or neutralize that thrown out at the opposite points in the polar faces, so that no magnetism or lines of force enter the armature at these points. In other words, by properly proportioning the comparative strengths of the armature and field-windings I am enabled to cause the armature to form what is in effect a neutral space in the field at the points corresponding with the position of the brushes and thereby prevent all sparking with the brushes set in the position shown in Fig. 2. The magnetic effect of the armature being directly opposed to that of the field, of course there will be little or no magnetic effect and no torque produced; but in all intermediate positions between this and that shown in Fig. 1 the torque will vary from zero to the full amount, while at the same time the neutral plane or region produced in the field by the armature will follow the position of the brushes and the sparking will amount to nothing, or practically nothing, at all these points.

Fig. 3 shows the effect of rotating the brushes in the wrong direction, the effect of which is that the magnetism in the armature agrees with and re-enforces that of the field, strengthening the magnetism which enters the armature at the points N and S, and consequently producing a maximum variation in the magnetism passing through any coil as the coil passes these points, and consequently the greatest amount of sparking. When the brushes are rotated in the direction shown in Fig. 3, the sparking begins the moment the brushes leave the neutral regions, increasing to a maximum between that and the position shown in Fig. 3.

In practically constructing the machine, in order to have the magnetizing effect of the field-coils less comparatively than is the case in the ordinary machine, I wind the field with fewer turns of wire, and, as I have already explained, I am enabled to do this without diminishing the general strength of the magnet by employing the form of armature in which the iron body of the core reaches out to the pole-pieces, and the copper wires or conductors are embedded in this core.

Fig. 5 illustrates the effect in an ordinary machine of revolving the brushes in the same direction as that represented in Fig. 2. The magnetizing effect of the armature-coils being so much weaker than that of the field-coils, the magnetism thrown out by the armature at the points N and S only partially or immaterially neutralize those thrown in from the field at these points, and consequently the coils at these points are subjected to an inductive influence while passing under the brushes and the sparking is produced. The same is true for the intermediate positions of the brushes between that shown in Fig. 4 and that shown in Fig. 5, the sparking beginning the moment the brushes leave the neutral region and becoming worse as they are moved farther toward the position shown in Fig. 5.

In Figs. 6, 7, and 8, A represents the commutator, and B B the brushes, of an electric motor constructed according to my invention. In order to construct an automatic speed-governor operating on this principle, I mount the brushes B B upon an ordinary rocking brush holder or support C, so that they are capable of being rotated from their normal or neutral position to an angle of at least ninety degrees. To enable this to be done with as little friction as possible, I mount the arm or support C upon rollers c, which travel in a cylindrical groove cut in the bearing, and form the bearing between the arm and the journal. Upon the shaft of the machine I fix a centrifugal speed-governor D D, consisting of two centrifugal arms or weights D D, pivoted to an arm or disk E, rigidly attached to the shaft and connected by links with a sliding collar F, which is connected, as clearly shown, by a series of levers with the rocking brush-holder. The sliding collar F is held in its normal position, as shown in Figs. 7 and 8, by a compression-spring f, which resists the centrifugal effect of the arms D D more and more as the arms are thrown out. In order to make the governor as nearly isochronous as possible and to secure the full range of movement for the brushes with a small variation in speed, I make the arms in the form shown—that is, so that when they are drawn together a considerable portion of their weight is in the plane of the axis of the shaft, and consequently this part of the arms has no centrifugal effect in throwing the arms outward; but as soon as the arms begin to move outward by an increase of speed this part of the arms begins to exert a centrifugal effect sufficient to neutralize the increasing tension of the spring F. By means of this governor I am enabled to cause the brushes to be shifted with a very slight variation in speed from the position shown in Fig. 8 through a series of positions up to ninety degrees or less, which will automatically vary the torque or counter electro-motive force produced by the motor, and consequently the power developed, the speed remaining constant within the limits necessary to cause the governor to operate.

My invention may also be employed for the regulation of the electro-motive force of dynamo-electric machines or generators instead of the regulation of the counter electro-motive force or the torque in the case of electric motors. By constructing the dynamo-machine as I have described and rotating the brushes in the proper direction the electro-motive force developed by the machine may be varied from zero to a maximum, according to the requirements, and this may be done either by hand or by any automatic means of shifting the brushes operated by variations in the current strength, as would be the case in the ordinary arc-light circuits, for example.

I am aware that electric motors have heretofore been devised upon what is known as the "repulsive" principle of action—that is to say, motors in which the rotation of the armature is caused by the repulsive action of poles of the same polarity in the field-magnet and the armature—and I make no claims hereinafter broad enough to include such a construction. I am not aware, however, that any one has heretofore devised an electric motor or a dynamo-electric machine in which the magnetic effect of the armature is substantially equal to that of the field-poles or in which the magnetic relation of these two parts is such that there is a substantial magnetic balance between those portions of the field-magnet poles and the armature which lie in alignment with the contacting ends of the commutator-brushes. In other words, I am not aware that any one has heretofore devised a machine of this type in which there is substantially no magnetic inductive effect felt in those portions of the armature-core which are being energized at the time that the brushes are passing over consecutive commutator-segments connected to coils surrounding this part of the core.

My claims hereinafter made are directed, broadly, to the application of this principle and to the apparatus for practicing the methods claimed.

What I claim as my invention, and desire to secure by Letters Patent, is—

1. The described method of preventing injurious sparking at the commutator-brushes of a dynamo-electric machine or electric motor, consisting in producing equal and opposing magnetic effects between the field-magnet poles and those portions of the armature-core which are being magnetized while the brushes are passing over consecutive commutator-segments connected to the coils which surround the aforesaid portions of the core, substantially as described.

2. The described method of regulating a dynamo-electric machine or electric motor and simultaneously preventing injurious sparking at the commutator-brushes, consisting in producing equal opposing magnetic effects between the field-magnet poles and those portions of the armature-core which are being magnetized as the brushes pass over consecutive commutator-segments connected to the coils which surround the aforesaid portions of the armature-core and in simultaneously shifting the brushes in proportion to the load, substantially as described.

3. A dynamo-electric machine or electric motor having the effective magnetic portions of its field-magnets and armature of substantially equal magnetic capacity and so wound as to produce like polarity and an equal opposing effect between said field-magnet poles and those portions of the armature-core which are being magnetized at the time that the brushes are passing over consecutive segments of the commutator, substantially as described.

4. A dynamo-electric machine or electric motor having the effective magnetic portions of its field-magnets and armature of substantially equal magnetic capacity and so wound as to produce like polarity and an equal opposing effect between said field-magnet poles and those portions of the armature-core which are being magnetized at the time that the brushes are passing over consecutive segments of the commutator, in combination with means for varying the angular position of the brushes in accordance with the load and simultaneously maintaining the aforesaid magnetic balance, substantially as described.

5. A dynamo-electric machine or electric motor having the effective magnetic portions of its field-magnets and armature of substantially equal magnetic capacity and so wound as to produce like polarity and an equal opposing effect between said field-magnet poles and those portions of the armature-core which are being magnetized at the time that the brushes are passing over consecutive segments of the commutator, in combination with an automatic regulator adapted to shift the brushes and maintain the aforesaid magnetic balance, substantially as described.

SCHUYLER S. WHEELER.

Witnesses:
FRANCIS B. CROCKER,
W. H. GEERS.